United States Patent
Sase et al.

(10) Patent No.: US 7,403,365 B2
(45) Date of Patent: Jul. 22, 2008

(54) OVER-CURRENT DETECTION CIRCUIT AND METHOD FOR POWER-SUPPLY DEVICE

(75) Inventors: Takashi Sase, Hitachi (JP); Akihiko Kanouda, Hitchinaka (JP); Yosuke Kawakubo, Odawara (JP); Kozaburo Kurita, Ohme (JP)

(73) Assignee: Hitachi, Ltd., Tokyo (JP)

( * ) Notice: Subject to any disclaimer, the term of this patent is extended or adjusted under 35 U.S.C. 154(b) by 158 days.

(21) Appl. No.: 11/505,821

(22) Filed: Aug. 18, 2006

(65) Prior Publication Data

US 2007/0188958 A1 Aug. 16, 2007

(30) Foreign Application Priority Data

Feb. 15, 2006 (JP) ............................... 2006-037871

(51) Int. Cl.
*H02H 9/08* (2006.01)

(52) U.S. Cl. ..................................... 361/93.1; 361/93.9

(58) Field of Classification Search .................. 361/18, 361/93.1, 93.7–93.9; 323/224, 282; 363/24, 363/34, 50

See application file for complete search history.

(56) References Cited

U.S. PATENT DOCUMENTS 6,031,361 A 2/2000 Burstein et al.

FOREIGN PATENT DOCUMENTS

JP 2003-060449 A 2/2003

*Primary Examiner*—Stephen W Jackson
*Assistant Examiner*—Danny Nguyen
(74) *Attorney, Agent, or Firm*—Crowell & Moring LLP (57) ABSTRACT

An over-current detection circuit using the ON-voltage of a main MOSFET is provided, which is resistant to process variations of a main MOSFET and is not easily influenced by switching noise. Separately from a main MOSFET (Q1), a sense MOSFET (Q3) whose size is 1/m of the main MOSFET is provided and it is caused to be normally on. A DC ON-voltage generated when a current that is 1/m of an over-current value is caused to flow through the sense MOSFET is obtained as a reference voltage for over-current setting. The ON-voltage when the main MOSFET is on is sampled and held, and it is obtained as a DC voltage. These DC voltages are compared in a comparator (COMP).

10 Claims, 5 Drawing Sheets

STEADY OPERATION

FIG. 2 B

OVER-CURRENT OPERATION

STEADY OPERATION

FIG. 5 B

OVER-CURRENT OPERATION

STEADY OPERATION

FIG. 7 B

OVER-CURRENT OPERATION

OVER-CURRENT DETECTION CIRCUIT AND METHOD FOR POWER-SUPPLY DEVICE

BACKGROUND OF THE INVENTION

1. Field of the Invention

The present invention relates to an over-current detection circuit and method for a power-supply device. In particular, it relates to an over-current detection circuit and method for a power-supply device, whereby, when detecting an over-current using the ON-voltage of a main MOSFET, variations of the ON-voltage due to process variations of the ON-resistance of the main MOSFET or the influence of switching noise is reduced, thereby stabilizing the detection accuracy.

2. Background Art

Conventionally, a built-in power supply of an LSI circuit such as an FPGA or CPU chip is suitable for a compact or low-cost system/unit due to reduction of external components and for high-speed current response (high di/dt) of a load side. As an over-current detection method in such case, the ON-voltage of a main MOSFET is used. The following methods are known as such a method using the ON-voltage of a main MOSFET.

According to an example of the method using the ON-voltage of a main MOSFET, an over-current is detected by comparing the ON-voltage of a main MOSFET obtained via a sample-and-hold circuit and a reference voltage for over-current setting in a comparator (see JP Patent Publication (Kokai) No. 2003-60449 A, for example).

According to another example of the method using the ON-voltage of a main MOSFET, a sense MOSFET with a size ratio of n:1 with respect to a main MOSFET is provided, and a current that is 1/n of an over-current value is caused to flow through the sense MOSFET. When these two MOSFETs are turned on at the same time, the ON-voltage of the main MOSFET and the ON-voltage of the sense MOSFET are compared in a comparator, so as to detect an over-voltage (see U.S. Pat. No. 6,031,361, for example).

SAMMARY OF THE INVENTION

However, the conventional over-current detection method for a power-supply device that uses the ON-voltage of a main MOSFET, described in the above Background Art, is problematic in that the ON-voltage is easily influenced by process variations of the ON-resistance of the main MOSFET.

Thus, it is an object of the present invention to make variations of the ON-voltage less subject to process variations of the ON-resistance of the main MOSFET. Further, it is another object of the present invention to suppress the influence of switching noise superimposed on a reference voltage for over-current detection and the ON-voltage of the main MOSFET. Furthermore, it is another object of the present invention to stabilize over-current detection accuracy and detect an over-current easily, even when the switching frequency of a power supply exceeds 10 MHz.

The method disclosed in JP Patent Publication (Kokai) No. 2003-60449 A is problematic in that over-current detection accuracy is low and stable over-current detection is difficult, since the reference voltage is influenced by variations of the ON-voltage due to process variations of the ON-resistance of a main MOSFET. Further, the method disclosed in U.S. Pat. No. 6,031,361 is problematic in that detection is easily influenced by switching noise and stable over-current detection is difficult, since square waves are compared with each other. Furthermore, another problem is that, in cases where the switching frequency of a power supply exceeds 10 MHz, since square waves are compared, a high-speed comparator is necessary for such comparison.

The present invention has been made in view of the above conventional problems, and it is an object of the invention to provide an over-current detection circuit for a power-supply device that can improve over-current detection accuracy and that can stably detect an over-current, by preventing a reference voltage from being influenced by variations of the ON-voltage due to process variations of the ON-resistance of a main MOSFET.

It is another object of the invention to provide an over-current detection method for a power-supply device that can improve over-current detection accuracy and that can stably detect an over-current, by preventing a reference voltage from being influenced by variations of the ON-voltage due to process variations of the ON-resistance of a main MOSFET.

In order to solve the above problems, an over-current detection circuit for a power-supply device according to the present invention is contained in a buck type DC-DC converter including a pair of power semiconductor switching components, a driving means for the pair of power semiconductor switching components, a pulse-width modulation type oscillator for supplying a driving signal to the driving means, and an error amplifier for supplying an error signal with respect to a reference voltage to the oscillator. The circuit is provided with a sense power semiconductor switching component, separately from a high side power semiconductor switching component that is one of the pair of power semiconductor switching components, the sense power semiconductor switching component having a 1/m size of the high side power semiconductor switching component. The circuit has a means for causing the sense power semiconductor switching component to be normally on. It also includes a means for detecting an over-current by comparing, in a comparator, a reference voltage for over-current detection, which is the ON-voltage obtained by causing a current that is 1/m of an over-current value to flow through the sense power semiconductor switching component, and a voltage obtained by applying the ON-voltage when the high side power semiconductor switching component is on to a sample-and-hold circuit comprised of a switch and a capacitor. Note that m refers to a positive integer (the same applies in the following).

In the over-current detection circuit for a power-supply device, the high side power semiconductor switching component and the sense power semiconductor switching component are mounted on the same chip.

Further, in the over-current detection circuit for a power-supply device, the comparator comprises a pair of level-shift circuits and a differential pair circuit.

Further, in the over-current detection circuit for a power-supply device, a resistor is connected in series to the switch of the sample-and-hold circuit.

Further, in the over-current detection circuit for a power-supply device, the driving signal of the high side power semiconductor switching component is separated from that of the sense power semiconductor switching component. The driving period of the sense power semiconductor switching component is the first half of that of the high side power semiconductor switching component.

Further, the over-current detection circuit for a power-supply device comprises an integrating circuit including R and C, a differentiation circuit including C and R, a bias circuit for applying a bias voltage to the differentiation circuit, a comparator for comparing the output from the bias circuit and the output from the differentiation circuit, and a two-input AND gate. The output from the pair of power semiconductor switching components is provided as the input to the integrating circuit. The output from the comparator is provided as one input to the AND gate. The driving signal of the high side power semiconductor switching component is provided as the other input to the AND gate. The output signal of the circuit is used as a signal for generating the driving period of the sense power semiconductor switching component.

Further, in the over-current detection circuit for a power-supply device, instead of the means for causing the sense power semiconductor switching component to be normally on, the driving signal of the sense power semiconductor switching component is set to be wider than the driving period of the high side power semiconductor switching component.

Further, as an applied product, the invention provides an information processing equipment including, as a power-supply device, a buck type DC-DC converter containing the over-current detection circuit for a power-supply device.

The information processing equipment comprises a CPU, a memory, and a hard-disk drive for storing information in the memory.

Further, the invention provides an over-current detection method for a power-supply device used for a buck type DC-DC converter including a pair of power semiconductor switching components, a driving means for the pair of power semiconductor switching components, a pulse-width modulation type oscillator for supplying a driving signal to the driving means, and an error amplifier for supplying an error signal with respect to a reference voltage to the oscillator. A sense power semiconductor switching component is provided, separately from a high side power semiconductor switching component that is one of the pair of power semiconductor switching components, the sense power semiconductor switching component having a 1/m size of the high side power semiconductor switching component. The method includes a step of causing the sense power semiconductor switching component to be normally on, and a step of detecting an over-current by comparing, in a comparator, the ON-voltage obtained by causing a current that is 1/m of an over-current value to flow through the sense power semiconductor switching component, that is, a reference voltage for over-current detection, and a voltage obtained by applying the ON-voltage when the high side power semiconductor switching component is on to a sample-and-hold circuit comprised of a switch and a capacitor.

As described above, in accordance with the over-current detection method for a power-supply device of the present invention, since both of the ON-voltage of the main MOSFET and the ON-voltage of the sense MOSFET used for obtaining the reference voltage for over-current setting are DC voltages, it is easy to compare them in a comparator. In this way, since variations of the ON-voltage due to process variations of the ON-resistance of the MOSFET or the influence of switching noise is suppressed, the invention can provide an over-current detection method for a power-supply device that enables stable over-current detection with high detection accuracy.

Since a built-in sense MOSFET and a main MOSFET of an LSI circuit or IC are used, external components for over-current sense are unnecessary. Thus, the invention has an advantageous effect that design and production cost for the system and unit can be reduced.

Further, since both of the ON-voltage of the main MOSFET and the ON-voltage of the sense MOSFET are DC-voltages, stable comparison of the ON-voltages is enabled without being subject to the performance of a comparator. Also, the comparison method of the ON-voltages is made easier, and even when the switching frequency of a power-supply device exceeds 10 MHz, over-current detection can be easily carried out.

DESCRIPTION OF PREFERRED EMBODIMENTS OF THE INVENTION

In the following, preferred embodiments for carrying out an over-current detection circuit and method for a power-supply device according to the present invention will be described in detail with reference to the accompanying drawings. FIGS. 1 to 11 are drawings for exemplifying embodiments of the present invention. In the drawings, portions designated with the same reference characters denote the same portions, and they are the same in terms of basic structures and operations.

With regard to the over-current detection circuit for a power-supply device of the present invention, in a power-supply device of a buck type DC-DC converter, separately from a high side power MOSFET called a main MOSFET, there is provided a sense MOSFET whose size is 1/m of the high side power MOSFET and that is caused to be normally on. Over-current detection is carried out by comparing, in a comparator, a reference voltage for over-current setting that is obtained by causing a current that is 1/m of an over-current value to flow through the sense MOSFET and a DC hold voltage obtained by sampling and holding the ON-voltage when the high side power MOSFET is turned on. An over-current detection circuit and an over-current detection method based on such principle of the present invention will be described with reference to the following first to fifth embodiments.

First Embodiment

Figure 1:
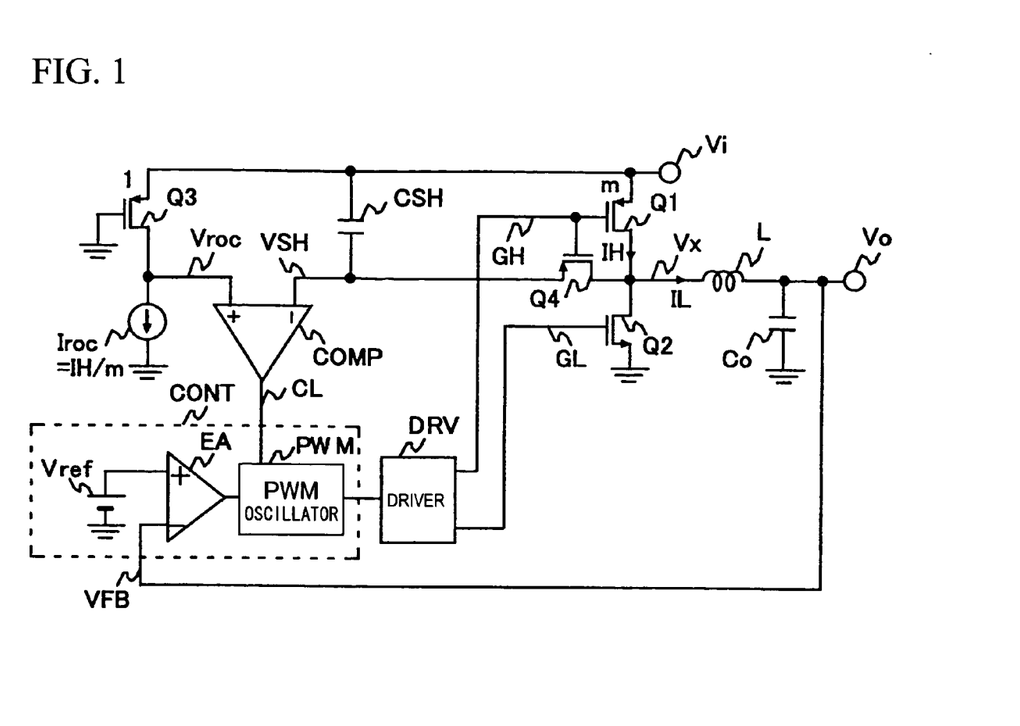
FIG. 1 shows a circuit diagram of a power-supply device containing an over-current detection circuit according to a first embodiment of the present invention.

FIG. 1 shows a circuit diagram of a power-supply device containing an over-current detection circuit according to a first embodiment of the present invention. In FIG. 1, character Vi denotes an input terminal and character Vo denotes an output terminal. The input terminal Vi is connected to a high side power MOSFET (Q1), and a low side power MOSFET (Q2) is connected to ground. The midpoint between the power MOSFET (Q1) and the power MOSFET (Q2) is connected to an LC smoothing filter (power system output filter) comprising an inductor L and a capacitor Co, and the midpoint of the LC smoothing filter is connected to the output terminal Vo and one input (−) of an error amplifier EA.

The other input (+) to the error amplifier EA is connected to a reference voltage Vref. The output from the error amplifier EA is connected to a pulse-width modulation (PWM) oscillator PWM and a driver circuit DRV. The PWM is connected to the gate of the power MOSFET (Q1) and the power MOSFET (Q2) via the driver circuit DRV. The power MOSFETs (Q1 and Q2) are driven with a reversed phase and are alternatively conducted. Normally, a combination of the reference voltage Vref, the error amplifier EA, and the pulse-width modulation type oscillator PWM is referred to as a control circuit CONT.

Next, referring to FIG. 1, a configuration of the over-current detection circuit according to the present embodiment will be described. To the input terminal Vi, there are connected a sense MOSFET (Q3) and a hold capacitor CSH. The midpoint between the hold capacitor CSH and a switching MOSFET (Q4) is connected to the negative input to a comparator COMP. The midpoint between the sense MOSFET (Q3) and a constant current source Iroc is connected to the positive input to the comparator COMP. Further, the output from the comparator COMP is connected to the pulse-width modulation type oscillator PWM in the control circuit CONT.

In this embodiment, it is necessary that the high side power MOSFET (Q1), which is referred to as a main MOSFET, and the sense MOSFET (Q3) are on the same chip, and the MOS size ratio of the high side power MOSFET (Q1) to the sense MOSFET (Q3) is m:1. The gate of the sense MOSFET (Q3) is connected to ground and it is normally on action.

Next, an output voltage stabilization operation in a power-supply circuit shown in FIG. 1 will be described. First, in a steady operation of a buck type converter, an input voltage applied to the input terminal Vi is converted to a voltage VFB through an on-off control of the high side power MOSFET (Q1) and the low side power MOSFET (Q2) via the LC smoothing filter. The converted voltage VFB is compared with the reference voltage Vref by the error amplifier EA. As a result, an amplified error voltage is generated as the output from the error amplifier EA. The error voltage is converted into a PWM pulse via the pulse-width modulation type oscillator PWM. In the driver circuit DRV, the PWM pulse is converted into an on-off time ratio (duty ratio:α) for driving the high side power MOSFET (Q1) and the low side power MOSFET (Q2). Further, a negative feedback control is carried out so that the error voltage becomes zero, and as a result, the converted voltage VFB becomes equal to the reference voltage Vref. In such case, the converted voltage VFB obtained through the LC smoothing filter in a steady state, that is, an output voltage Vout obtained at the output terminal Vo, is proportional to the duty ratio a of an input voltage Vin applied to the input terminal Vi. Thus, the relational expression Vout=VFB=Vref=α·Vin is satisfied.

Since the duty ratio α is defined by ON-time/(the sum of ON-time and OFF-time), the value is between 0 and 1. Further, since the duty ratio α is equal to the voltage conversion ratio, it can be expressed as a ratio of the output voltage Vout to the input voltage Vin (Vout/Vin). Thus, a desired voltage proportional to the duty ratio a of the input voltage Vin can be obtained at the output from the LC smoothing filter (i.e., output terminal Vo) as the output voltage Vout.

Next, a current that flows through an inductor L necessary for over-current detection, that is, a current waveform of an inductor current IL will be described. The inductor current IL has a waveform in which a change current that is determined based on the input voltage Vin, output voltage Vout, value L of the inductor L, and switching cycle Ts (reciprocal number of switching frequency) is superimposed on the DC component of an output (load) current. The amplitude of the change current is ΔIL (on)=(Vin−Vout)/L·Ts·(Vout/Vin) in cases where a change current ΔIL (on) when the high side power MOSFET (Q1) is on increases, and it is ΔIL (off)=Vout/L·Ts·(1−Vout/Vin) in cases where a change current ΔIL (off) when the high side power MOSFET (Q1) is off (low side power MOSFET (Q2) is on) decreases. Thus, in a steady state, since ΔIL (on)=ΔIL (off) is satisfied, the width of the increase and decrease is the amplitude of the change current of the inductor current IL. Over-current detection is carried out by detecting a peak current in which the change current component is superimposed on the DC component of a load current.

Over-current detection in the power source circuit shown in FIG. 1 is performed by obtaining, as the ON-voltage, the inductor current IL that flows through the ON-resistance of the high side power MOSFET (Q1) when the high side power MOSFET (Q1) is on.

Figure 2:
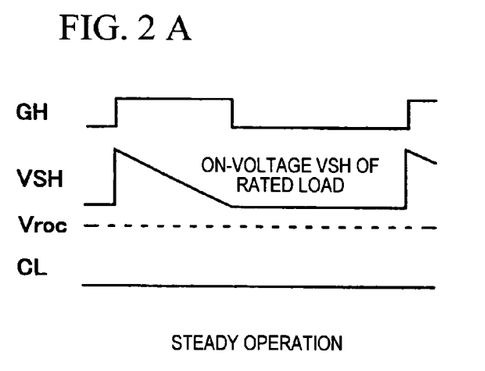
FIG. 2 shows operating waveforms of a principal portion of the circuit shown in FIG. 1.

FIG. 2 shows operating waveforms of a principal portion of the circuit shown in FIG. 1. The operation of the over-current detection will next be described with reference to the waveforms of FIG. 2.

First, in the case of a steady operation of a rated load shown in FIG. 2(a), since the change current of the inductor current IL gradually increases when a gate driving signal GH of the high side power MOSFET (Q1) is "High", that is, when it is on, the ON-voltage of the high side power MOSFET (Q1) also gradually increases. As a result, the voltage at the point Vx gradually decreases from the side of the input voltage Vin. A node voltage VSH of the hold capacitor CSH is also decreased via the switching MOSFET (Q4) that simultaneously turns on based on the gate driving signal GH of the high side power MOSFET (Q1). Next, when the gate driving signal GH of the high side power MOSFET (Q1) becomes "Low", that is, when it is turned off, the switching MOSFET (Q4) is simultaneously turned off. Thus, the voltage at the time of switching is sampled and held as the voltage VSH and a certain value of voltage is obtained. While this voltage VSH is compared with the reference voltage Vroc for over-current detection by the comparator COMP, because of the steady operation, the output from the comparator COMP remains "Low." Thus, an over-current detection signal CL is not generated.

Next, in the case of over-current operation as shown in FIG. 2(b), while the shape of amplitude waveform of the voltage VSH does not change, since the DC component of the inductor current increases by the amount of over-current, the waveform of the voltage VSH drops. As a result, the voltage VSH becomes lower than the reference voltage Vroc for over-current detection, the output from the comparator COMP switches from "Low" to "High", and an over-current is detected and outputted to the control circuit CONT as the over-current detection signal CL.

The principle of over-current detection for generating the over-current detection signal CL as described above will be described in the following, based on the relationship between the high side power MOSFET (Q1) and the sense MOSFET (Q3).

First, the high side power MOSFET (Q1) and the sense MOSFET (Q3) are provided on the same chip in proximity to each other. Regarding the size of these MOSFETs, the size of the sense MOSFET (Q3) is set to be 1/m of the high side power MOSFET (Q1). Next, the constant current source Iroc is set such that the current flowing through the normally-on sense MOSFET (Q3) becomes 1/m of the current IH (peak value of the inductor current IL when the high side power MOSFET (Q1) is on) that flows through the high side power MOSFET (Q1). If set as described above, the ON-voltage generated when a current that is 1/m of the current IH of the high side power MOSFET (Q1) is caused to flow through the normally-on sense MOSFET (Q3) and the ON-voltage generated when the current IH is caused to flow through the high side power MOSFET (Q1) become equal. Further, since these MOSFETs are set on the same chip in proximity to each other, even when process variations of the ON-resistance of the power MOSFET are present, both MOSFETs are equally influenced. As a result, their ON-voltage drops will be equal. Thus, by setting the over-current value defined based on the high side power MOSFET (Q1) to be IH and a current that is 1/m of this IH to be the constant current source Iroc, when the value of the current that flows through the high side power MOSFET (Q1) reaches an over-current value, they can be compared in the form of voltage Vroc and the voltage VSH in the comparator COMP, whereby the over-current can be detected as the over-current detection signal CL at the output from the comparator COMP. Normally, when the over-current detection signal CL is detected, in order not to cause damage to components such as a power MOSFET, some operations are performed. For example, the oscillation of the pulse-width modulation type oscillator PWM is caused to stop or, while not shown, a power MOSFET is forced to be in the OFF-state, in some cases.

As described above, in the present embodiment, since variations of the ON-voltage due to process variations of the ON-resistance of the power MOSFET is suppressed by providing the sense MOSFET in proximity to the power MOSFET on the same chip and generating a reference voltage for over-current detection, detection accuracy is improved. Thus, the invention is effective in stable over-current detection.

Further, since the reference voltage Vroc for over-current detection, which is an input to the comparator COMP, and the node voltage VSH are caused to be DC, malfunction of the comparator caused by switching noise can be prevented. Further, since the inputs to the comparator are DC voltages, a conventional high-speed comparator is not necessary. Thus, even when the switching frequency of a power supply exceeds 10 MHz, stable over-current detection can be easily achieved.

Figure 3:
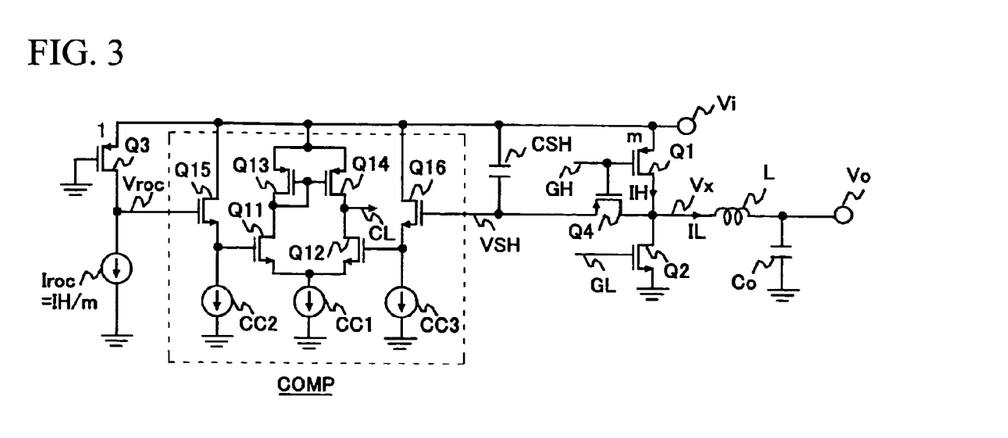
FIG. 3 shows a configuration example when a comparator COMP shown in FIG. 1 is structured with MOSFETs.

FIG. 3 shows an example where the comparator COMP shown in FIG. 1 comprises MOSFETs. Since the electric potential of the reference voltage Vroc for over-current detection and that of the node voltage VSH are significantly deviated to the input voltage Vin side, there can be obtained a circuit. In the circuit, the reference voltage Vroc side for over-current detection is connected to a differential pair circuit comprising MOS (Q11 to Q14) and a constant current source CC1 via a level-shift circuit comprising a MOS (Q15) and a constant current source CC2, and the node voltage VSH side is connected to the above differential pair circuit via a level-shift circuit comprising a MOS (Q16) and a constant current source CC3. The over-current detection signal CL is outputted from the midpoint between the MOS (Q12) and the MOS (Q14). Since the operation of the comparator COMP is structured so that the over-current detection signal CL switches from "Low" to "High" when the voltage VSH becomes lower than the reference voltage Vroc for over-current detection, by using this configuration, occurrence of over-current can be detected.

Second Embodiment

Figure 4:
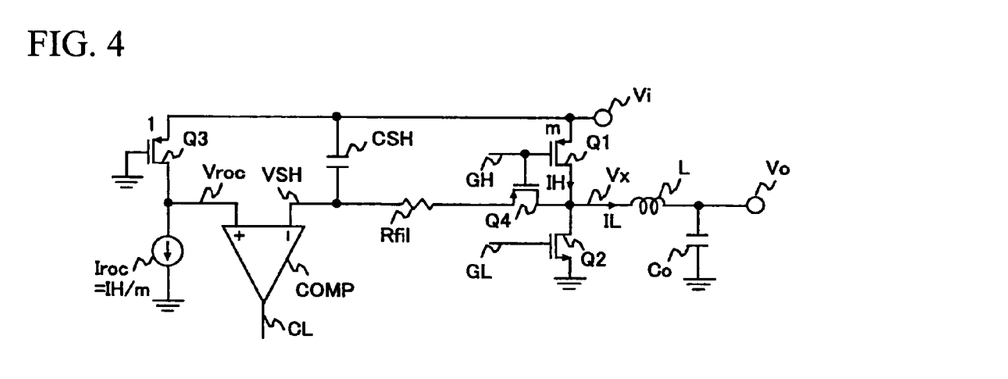
FIG. 4 shows a circuit diagram of a power-supply device containing an over-current detection circuit according to a second embodiment of the present invention.
Figure 5:
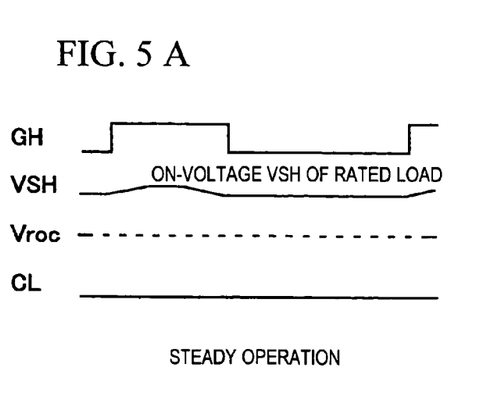
FIG. 5 shows operating waveforms of a principal portion of the circuit shown in FIG. 4.

FIG. 4 shows a circuit diagram of a power-supply device containing an over-current detection circuit according to a second embodiment of the present invention. In the figure, since a control circuit CONT and a driver DRV are the same as those shown in FIG. 1, the illustration thereof is omitted. FIG. 5 shows operating waveforms of a principal portion of the circuit shown in FIG. 4.

When the circuit shown in FIG. 4 and the circuit shown in FIG. 1 are compared, only the difference is that a resistor Rfil is connected in series with the switching MOSFET (Q4). Structured in this way, the present embodiment has the advantageous effect that, in addition to the advantageous effect of the first embodiment of the present invention, over-current detection can be achieved with a reduced ripple component and at a value closer to a DC voltage as the VSH in FIG. 5 shows, by smoothing the on-period waveform of the high power MOSFET (Q1) of the voltage VSH shown in FIG. 4 via a filtering function of a hold capacitor CSH and the resistor Rfil.

Third Embodiment

Figure 6:
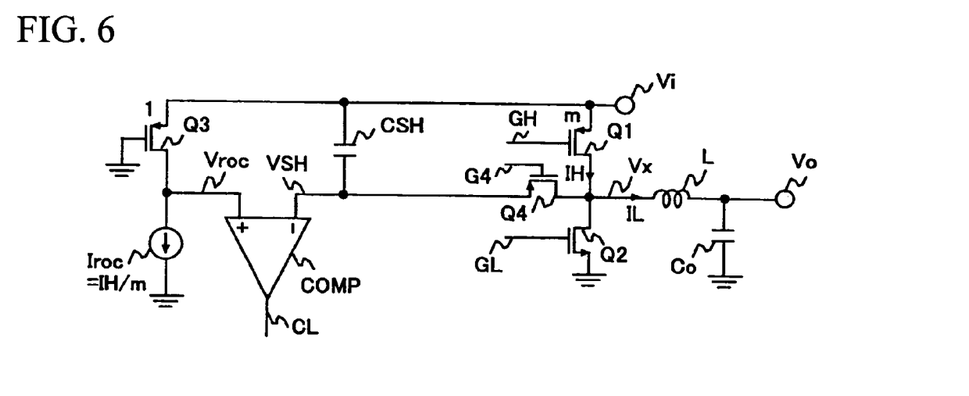
FIG. 6 shows a circuit diagram of a power-supply device containing an over-current detection circuit according to a third embodiment of the present invention.
Figure 7:
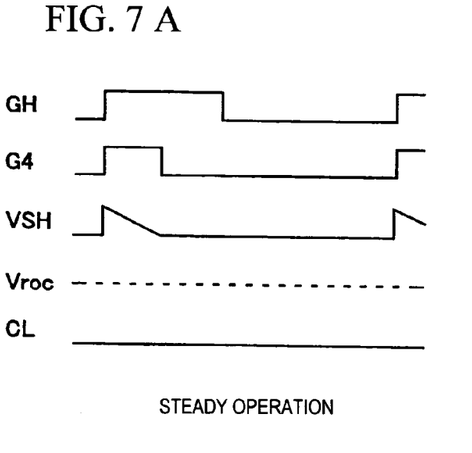
FIG. 7 shows operating waveforms of a principal portion of the circuit shown in FIG. 6.

In an over-current detection circuit according to a third embodiment of the present invention, an over-current value is detected not using a peak current. FIG. 6 shows a circuit diagram of a power-supply device containing an over-current detection circuit according to the third embodiment of the present invention. However, in the figure, since a control circuit CONT and a driver DRV are the same as those shown in FIG. 1, the illustration thereof is omitted. FIG. 7 shows operating waveforms of a principal portion of the circuit shown in FIG. 6.

The over-current detection circuit shown in FIG. 6 differs from the over-current detection circuits shown in FIGS. 1 and 4 in that a gate driving signal G4 of a switching MOSFET (Q4) is set separately from a gate driving signal GH of a high side power MOSFET (Q1). Further, as shown in FIG. 7, it is structured such that the on-period of the gate driving signal G4 (generating means will be described later) of the switching MOSFET (Q4) is up to one half of the on-period of the gate driving signal GH of the high side power MOSFET (Q1). Structured in this way, the present embodiment is allowed to have the advantageous effect that, in addition to the advantageous effect of the first embodiment of the present invention, over-current detection can be achieved at a value corresponding to the DC of the inductor current IL, that is, a load current value.

Figure 8:
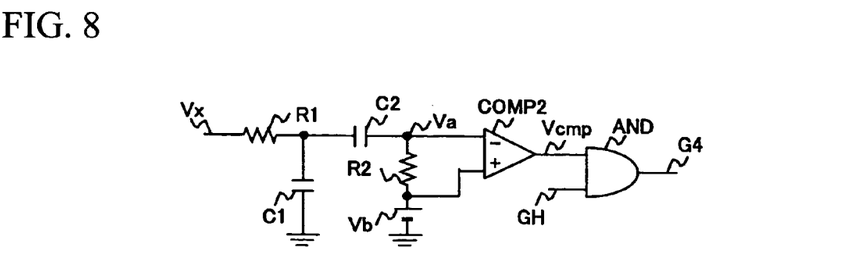
FIG. 8 shows a circuit diagram of a circuit for generating a gate driving signal G4 shown in FIG. 6.
Figure 9:
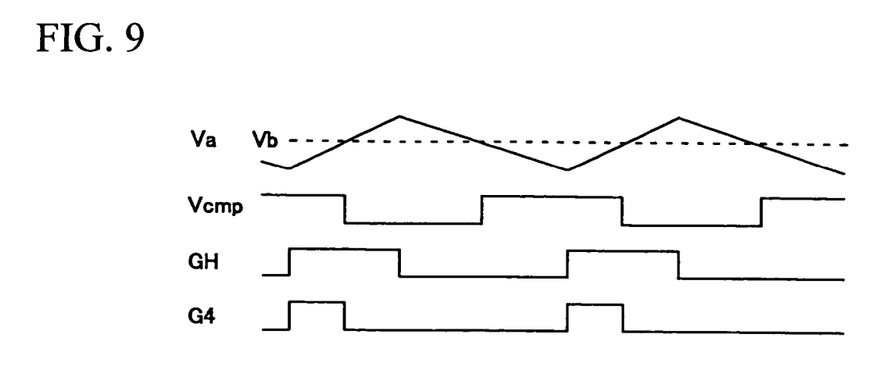
FIG. 9 shows operating waveforms of a principal portion of the circuit shown in FIG. 8.

FIG. 8 shows a circuit diagram of a circuit for generating the gate driving signal G4 shown in FIG. 6. FIG. 9 shows operating waveforms of a principal portion of the circuit shown in FIG. 8.

The circuit shown in FIG. 8 comprises a CR filter type integrating circuit including a resistor R1 and a capacitor C1, a differentiation circuit including a capacitor C2 and a resistor R2, a bias circuit that provides the differentiation circuit with a bias voltage Vb, a comparator COMP2, and an AND gate AND.

Regarding an operation of the circuit shown in FIG. 8, a voltage Vx is applied to the midpoint between the high side power MOSFET (Q1) and a low side power MOSFET (Q2) so that the integrating circuit generates a saw-tooth wave voltage. This saw-tooth wave voltage passes through the differentiation circuit, and a saw-tooth wave voltage Va whose center voltage is the bias voltage Vb as shown in FIG. 9 can be obtained. Further, when this saw-tooth wave voltage Va and the bias voltage Vb are compared by the comparator COMP2, a voltage waveform Vcmp shown in FIG. 9 can be obtained at the output from the comparator COMP2. This voltage waveform and the gate driving signal GH of the high side power MOSFET (Q1) are inputted to the AND gate AND, and a waveform of the gate driving signal G4 of the switching MOSFET (Q4) shown in FIG. 9 can be obtained as the output. Namely, an increasing period of the saw-tooth wave voltage Va is only when the high side power MOSFET (Q1) is on. Thus, the signal G4 corresponding to one half of this period can be obtained.

While an arbitrary DC voltage can be used as the bias voltage Vb, an output voltage Vo may also be used, as the case may be.

Fourth Embodiment

Figure 10:
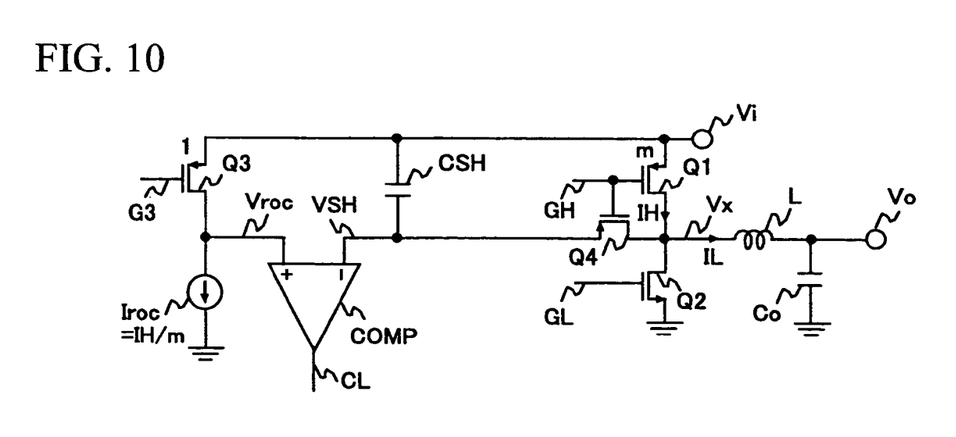
FIG. 10 shows a circuit diagram of a power-supply device containing an over-current detection circuit according to a fourth embodiment of the present invention.

FIG. 10 shows a circuit diagram of a power-supply device containing an over-current detection circuit according to a fourth embodiment of the present invention. In the figure, since a control circuit CONT and a driver DRV are the same as those shown in FIG. 1, the illustration thereof is not shown.

In the over-current detection circuit shown in FIG. 10, instead of connecting a gate potential of a sense MOSFET (Q3) as shown in FIGS. 1, 4, and 6 to ground, the gate potential is used as a gate driving signal G3 including a previously determined arbitrary pulse voltage. As a result, even when driven with the pulse voltage, apparently, a reference voltage for over-current detection is made to look like a DC voltage during the on-period of a high side power MOSFET. Structured in this way, since a current does not always flow through the sense MOSFET (Q3), it is effective in application where low power consumption is demanded such as in a power supply for portable equipment or the like. While a specific pulse voltage generating circuit that generates a pulse voltage as the gate driving signal G3 is not illustrated, it is only necessary to generate a pulse voltage such that a point of time when the sense MOSFET (Q3) is turned on comes earlier than that when the high side power MOSFET (Q1) is turned on, and a point of time when the sense MOSFET (Q3) is turned off comes later than that when the high side power MOSFET (Q1) is turned off. Thus, the pulse voltage generating circuit can be widely realized by using logic circuits. Such pulse voltage generating circuit can be applied to other embodiments of the present invention. In accordance with the present embodiment, in addition to the advantageous effect of the first embodiment of the present invention, the advantageous effect of reducing circuit power consumption can be obtained.

Fifth Embodiment

Figure 11:
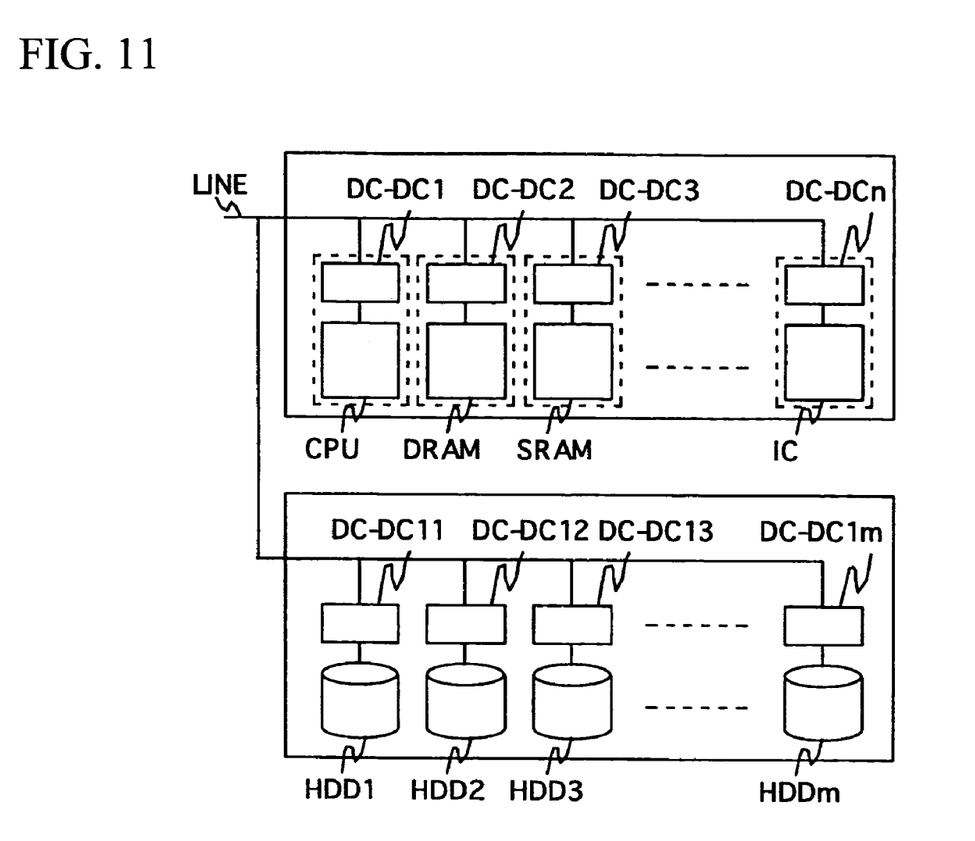
FIG. 11 shows a power supply system diagram of an information processing equipment whose power supply circuit contains an over-current detection circuit according to a fifth embodiment of the present invention.

FIG. 11 shows a power supply system diagram of an information processing equipment whose power supply circuit contains an over-current detection circuit according to a fifth embodiment of the present invention. The information processing equipment according to the present embodiment is an example where a power-supply device equipped with the over-current detection circuit according to the first to fourth embodiment of the present invention is applied to an HDD (Hard disk Drive).

DC-DC converters (DC-DC1 to DC-DCn) that are power-supply devices equipped with over-current detection circuits according to the first to fourth embodiment of the present invention are structured on the same chip with a processor CPU for controlling storing data in HDDs (HDD1 to HDDm), a high-speed large-capacity memory DRAM, an SRAM, and the like, and they provide electric power having an appropriate voltage value that varies depending on the target. While the HDDs (HDD1 to HDDm) are provided with the DC-DC converters (DC-DC11 to DC-DC1$m$) that are power-supply devices different from the power-supply devices containing over-current detection circuits according to the present invention, it is possible to use power-supply devices containing over-current detection circuits according to the present invention as power-supply devices of the HDDs (HDD1 to HDDm).

While, in each of the above embodiments, a power MOSFET is used as a semiconductor switching component, the over-current detection circuit for a power-supply circuit according to the present invention may be structured by using an another power switching component, such as an IGBT, a GaN, or a SiC (Silicon Carbide) device, instead of a power MOSFET, generally, as long as a sense power switching component can be structured on the same chip with a main power switching component.

While the over-current detection circuit and method for power-supply device of the present invention has been described with specific embodiments, the present invention is not limited thereto. Various changes or modifications may be made to the inventive features and functions of the above individual embodiments or other embodiments by one skilled in the art, without departing from the scope of the present invention.

The present invention can be applied as an over-current detection circuit of a power-supply circuit having a built-in sense power MOSFET on the same chip with a main power MOSFET.

Further, it can also be applied to an isolated-type DC-DC converter such as a single-transistor forward type, a two transistor forward type, a push-pull type, a half-bridge type, or a full-bridge type converter.

Furthermore, it can also be applied to a VRM, a DC-DC converter for portable equipment, a general-purpose DC-DC converter, and the like.

What is claimed is:

1. An over-current detection circuit for a power-supply device contained in a buck type DC-DC converter comprising:
   a pair of power semiconductor switching components;
   a driving means for the pair of power semiconductor switching components;
   a pulse-width modulation type oscillator for supplying a driving signal to the driving means; and
   an error amplifier for supplying an error signal with respect to a reference voltage to the oscillator,
   wherein, separately from a high side power semiconductor switching component that is one of the pair of power semiconductor switching components, a sense power semiconductor switching component having a 1/m size of the high side power semiconductor switching component is provided,
   wherein the circuit comprises a means for causing the sense power semiconductor switching component to be normally on, and a means for detecting an over-current by comparing, in a comparator, the ON-voltage obtained by causing a current that is 1/m of an over-current value to flow through the sense power semiconductor switching component, that is, the reference voltage for over-current detection, and a voltage obtained by applying the ON-voltage when the high side power semiconductor switching component is on to a sample-and-hold circuit comprised of a switch and a capacitor, wherein m refers to a positive integer.

2. The over-current detection circuit for a power-supply device according to claim 1, wherein the high side power semiconductor switching component and the sense power semiconductor switching component are mounted on the same chip.

3. The over-current detection circuit for a power-supply device according to claim 1, wherein the comparator comprises a pair of level-shift circuits and a differential pair circuit.

4. The over-current detection circuit for a power-supply device according to claim 1, wherein a resistor is connected in series to a switch of the sample-and-hold circuit.

5. The over-current detection circuit for a power-supply device according to claim 1, wherein a driving signal of the high side power semiconductor switching component is separated from that of the sense power semiconductor switching component, and wherein the driving period of the sense power semiconductor switching component is a first half of that of the high side power semiconductor switching component.

6. The over-current detection circuit for a power-supply device according to claim 5, comprising:
an integrating circuit comprising R and C;
a differentiation circuit comprising C and R;
a bias circuit for applying a bias voltage to the differentiation circuit;
a comparator for comparing the output from the bias circuit and the output from the differentiation circuit; and
a two-input AND gate,
wherein the output signal of the circuit is used as a signal for generating a driving period of the sense power semiconductor switching component, wherein the output from the pair of power semiconductor switching component is provided as an input to the integrating circuit, the output from the comparator is provided as the input to the AND gate, and the driving signal of the high side power semiconductor switching component is provided as the other input to the AND gate.

7. The over-current detection circuit for a power-supply device according to claim 1, wherein, instead of the means for causing the sense power semiconductor switching component to be normally on, the driving signal of the sense power semiconductor switching component is set wider than the driving period of the high side power semiconductor switching component.

8. An information processing equipment equipped with a buck type DC-DC converter, as a power-supply device, containing an over-current detection circuit for a power-supply device according to claim 1.

9. The information processing equipment according to claim 8, wherein the information processing equipment comprises a CPU, a memory, and a hard-disk drive for storing information in the memory as principal components, and wherein at least one of the components comprises the buck type DC-DC converter as a power supply.

10. An over-current detection method for a power-supply device used for a buck type DC-DC converter comprising a pair of power semiconductor switching components, a driving means for the pair of power semiconductor switching components, a pulse-width modulation type oscillator for supplying a driving signal to the driving means, and an error amplifier for supplying an error signal with respect to a reference voltage to the oscillator, wherein, separately from a high side power semiconductor switching component that is one of the pair of power semiconductor switching components, a sense power semiconductor switching component having a 1/m size of the high side power semiconductor switching component is provided, the method comprising:
a step of causing the sense power semiconductor switching component to be normally on; and,
a step of detecting an over-current by comparing, in a comparator, the ON-voltage obtained by causing a current that is 1/m of an over-current value to flow through the sense power semiconductor switching component, that is, the reference voltage for over-current detection, and a voltage obtained by applying the ON-voltage when the high side power semiconductor switching component is on to a sample-and-hold circuit comprised of a switch and a capacitor, wherein m refers to a positive integer.

* * * * *